US012567508B2

(12) United States Patent
Dupuis et al.

(10) Patent No.: US 12,567,508 B2
(45) Date of Patent: Mar. 3, 2026

(54) METHOD FOR MAINTAINING A NUCLEAR REACTOR

(71) Applicant: FRAMATOME, Courbevoie (FR)

(72) Inventors: Alexandre Dupuis, Cantin (FR); Eddy Szczurek, Le Quesnoy (FR); Mickael Lallier, Clairfayts (FR)

(73) Assignee: FRAMATOME, Courbevoie (FR)

( * ) Notice: Subject to any disclaimer, the term of this patent is extended or adjusted under 35 U.S.C. 154(b) by 335 days.

(21) Appl. No.: 18/284,287

(22) PCT Filed: Mar. 29, 2022

(86) PCT No.: PCT/EP2022/058234
§ 371 (c)(1),
(2) Date: Sep. 26, 2023

(87) PCT Pub. No.: WO2022/207624
PCT Pub. Date: Oct. 6, 2022

(65) Prior Publication Data

US 2024/0087763 A1 Mar. 14, 2024

(30) Foreign Application Priority Data

Mar. 31, 2021 (FR) ...................................... 2103357

(51) Int. Cl.
*G21C 19/20* (2006.01)

(52) U.S. Cl.
CPC ................................. *G21C 19/207* (2013.01)

(58) Field of Classification Search
CPC .................................................. G21C 19/207
USPC ................................................. 376/203, 260
See application file for complete search history.

(56) References Cited

U.S. PATENT DOCUMENTS 5,019,325 A * 5/1991 Larson ................. G21C 19/207
376/260
2012/0069947 A1* 3/2012 Ketcham .............. G21C 19/207
376/260

FOREIGN PATENT DOCUMENTS

CN 110060790 A 7/2019
FR 3032058 A1 7/2016

OTHER PUBLICATIONS

International Search Report for PCT/EP2022/058234.
(Continued)

*Primary Examiner* — Peter M Poon
*Assistant Examiner* — Daniel Wasil
(74) *Attorney, Agent, or Firm* — Davidson Kappel LLC

(57) ABSTRACT

A maintenance method is applied to a nuclear reactor having a drive assembly for a control rod assembly. The drive assembly includes a casing for receiving a drive rod lifting mechanism and a sheath for receiving the drive rod. A first lip is at an upper end of the casing, and a second lip is at a lower end of the sheath. The lips are welded together forming a seal between the casing and said sheath. The method includes removing the lips via material removal; carrying out a maintenance operation on the control rod assembly; creating a welding surface by machining the upper end of the casing; and creating a leak-tight connection between the casing and the sheath by welding the created welding surface to a matching welding surface provided at the lower end of the sheath. A replacement sheath may be used instead of the original sheath.

12 Claims, 13 Drawing Sheets

(56) References Cited

OTHER PUBLICATIONS

International Search Report for FR2103357.
Kiyoshi Takanabe et al. "Development of Advanced CRDM without Canopy Seal Welds", *Nuclear Engineering and Design*, Jan. 1, 2002, pp. 25-34.

* cited by examiner

METHOD FOR MAINTAINING A NUCLEAR REACTOR

The present disclosure relates to the maintenance of the control mechanisms of the rod control assemblies of a nuclear reactor.

BACKGROUND

A nuclear reactor typically comprises a pressure vessel wherein nuclear fuel assemblies forming the core of the nuclear reactor are arranged. The reactivity of the core is controlled, inter alia, by pushing in control rod assemblies into the core, each rod assembly comprising a plurality of rods made of a neutron-absorbing material.

Each control rod assembly is attached to the end of a drive rod which is moved by a rod assembly control mechanism (MCG).

The rod assembly control mechanisms (MCGs) each ensure the extraction, the maintenance or the insertion of a control rod assembly into the reactor core. MCGs should also authorize the free fall of the drive rods of the rod assemblies during the opening of automatic shutdown circuit breakers of the reactor.

Thereby, the nuclear reactor comprises a plurality of drive assemblies, each dedicated to a control rod assembly. Each drive assembly comprises an adapter rigidly attached to the cover of the pressure vessel, a casing for receiving a mechanism for lifting the drive rod of the control rod assembly and a sheath for receiving the drive rod. The casing, the lifting mechanism and the sheath form the MCG.

The adapter passes through the vessel lid and is rigidly fixed thereto. The adapter defines a passage through which the drive rod moves.

The lifting mechanism is generally called a lifting mechanism assembly (EML). Such mechanism is an actuator, the function of which is to control, to insert or to extract the drive rod of the control rod assemblies in the reactor core.

The casing and sheath together form a pressure enclosure, in fluidic communication, through the adapter, with the inside of the pressure vessel.

The casing has a casing lower end which is typically screwed onto an upper end of the adapter. The sealing between the casing lower end and the upper end of the adapter is achieved by a welded seal, often called a "canopy" seal.

The sheath forms the upper end of the pressure enclosure. The sheath delimits an internal volume wherein the drive rod is housed in the upper position of the control rod assembly. Such internal volume is closed at the top and communicates downwards with the internal volume of the casing.

In order to create a leak-tight connection between the sheath and the casing, it is possible to provide a first lip at an casing upper end and a second lip at a lower end of the sheath. The first lip and the second lip are sealed together and form a seal known as the "Omega" seal.

Since the EML is composed of moving parts which grip and move the drive rod, same is subjected to wear phenomena which require the replacement of an EML after a plurality of million cycles.

In most cases, replacements concern rod assembly control mechanisms (MCGs) which are reaching the end of life thereof. Occasionally, the MCGs can be replaced because of a malfunction.

One solution for the replacement of a rod assembly control mechanism (RMCG) on site is the replacement of the entire MCG by intervening at the "Canopy" seal. Such operation involves replacing the EML (lifting mechanism assembly) and the pressure chamber (sheath+casing).

The RMCG "Canopy" solution can include the following operations:

- Cut-out of the "Canopy" seal (located between the casing and the cover adapter),
- Removing the whole MCG,
- Machining the adapter in order to restore a weldable profile,
- Refitting a new MCG (with possible adjustment for pairing with the adapter),
- Reforming the "Canopy" welded seal,
- Associated re-qualifications.

Another solution could be to intervene at the "Omega" seal by cutting along the axis of the original weld.

The "Omega" RMCG solution could include the following operations:

- Cutting of the "Omega" seal (located between the sheath and the MCG casing) along the axis of the weld in order to preserve the initial design of the welded seal (vertical cut),
- Removing the sheath and the EML,
- Machining of the casing lip in order to restore a weldable profile identical to the initial profile,
- Refitting a new EML and a new sheath or the original sheath re-machined on site,
- Welding of the "Omega" seal identical to the initial design,
- Associated re-qualifications.

Such solutions are not entirely satisfactory.

The RMCG "Canopy" solution requires:

- A replacement of the complete MCG including the pressure enclosure (sheath+casing),
- The removal/refitting of the heat-insulation of the cover, which has an impact on the planning of the operation.

The "Omega" RMCG, with vertical cut-out of the welded seal, is also not satisfactory with regard the following points.

EML replacement tests were carried out by intervening at the "Omega" seal.

After cutting along the axis of the weld of the "Omega" seal (vertical cut), a dye penetrant inspection was carried out so as to make sure that the surface state has no defect. Out of more than 50 MCGs cut, 38% of the dye penetrant inspections showed non-conforming surface defects in the thin lips.

The random and unpredictable presence of such defects does not make it possible to prepare a job with sufficient mastery. Such defects call for systematic repair and justification. In most cases, the defects might not even be repairable or would require developing complex procedures.

As an emergency, an intervention on the Canopy seal would then be necessary.

SUMMARY

In such context, the present disclosure aims to provide a method for performing maintenance on a nuclear reactor which would include the maintenance of a rod assembly drive mechanism in a reliable and economical manner.

To this end, the present disclosure provides a method for maintaining a nuclear reactor, the nuclear reactor comprising at least one drive assembly for a control rod assembly, the or each drive assembly comprising an adapter rigidly attached to a cover of a pressure vessel of the nuclear reactor, a casing for receiving a mechanism for lifting a drive rod of the control rod assembly and a sheath for receiving the drive rod, the casing having a casing lower end connected in a leak-tight way to the adapter, the casing having a first lip at a casing upper end, the sheath having a second lip at a sheath lower end, the first lip and the second lip being welded together and forming an omega seal, the maintenance method comprising the following steps:

removing the first and second lips;

carrying out at least one maintenance operation on the drive assembly;

creating a welding surface at the casing upper end by machining said casing upper end;

creating leak-tight welded connection between the casing and said sheath or a replacement sheath, by welding the welding surface and a matching welding surface provided at the sheath lower end of said sheath or at a sheath lower end of the replacement sheath.

Thereby, the operation is carried out at the "Omega" seal. As a result, the casing remains in place and is not unnecessarily replaced. Only the EML and, if appropriate, the sheath are replaced.

It is not necessary to remove the heat-insulation of the cover. Time is thereby saved on planning and dosimetry.

As a result, time is saved on planning compared to the RMCG "Canopy" solution.

Moreover, by removing the first and second lips, the risk of defect inherent in the "Omega" RMCG described hereinabove is eliminated.

The leak-tight welded connection between the casing and the sheath is recreated at the newly machined welding surface on the casing.

Such zone is not a zone affected by heat due to the creation of the original welded seal, since the first and second lips have been removed. The applicant considers that said zone has no reason to have the defect mentioned hereinabove.

The maintenance method can further have one or a plurality of the following features, considered individually or in all technically possible combinations:

the matching welding surface is one piece with the sheath lower end, the welding surface being welded directly to the matching welding surface;

the casing upper end has a tubular shape about an axis of movement of the drive rod, the casing upper end having a substantially annular casing upper surface perpendicular to said axis of movement and oriented opposite the adapter, the casing upper end further having a casing radially inner surface and a casing radially outer surface, the sheath lower end having a substantially annular sheath upper surface perpendicular to said axis of movement and oriented opposite the adapter, the sheath lower end further having a radially outer surface, the welding surface being produced by machining at least said casing upper surface, and, if appropriate, additionally by machining the casing radially inner surface and/or the casing radially outer surface;

the method comprises a step of creating the matching welding surface at the sheath lower end by machining at least the sheath upper surface, and, if appropriate, in addition the sheath radially outer surface;

the welding surface and the matching welding surface form a V-shaped groove, hollowed out in the sheath upper surface and in the casing upper surface;

the welding surface is an annular zone of the casing upper surface and the matching welding surface is a zone of the sheath radially outer surface, a fillet weld being made during the step of creating the leak-tight welded connection;

the welding surface is provided on a third lip machined in the casing upper end, and the matching welding surface is provided on a fourth lip supported by the sheath upper end, the third lip and the fourth lip together defining an omega seal;

a casing half-cavity is hollowed out in a surface of the casing, a sheath half-cavity being hollowed out in a surface of the sheath, the casing half-cavity and the sheath half-cavity together defining a cavity arranged along the welded connection, the welding surface and the matching welding surface forming a groove emerging into the cavity;

the cavity is arranged axially or radially under the welded seal;

a casing stress-relief groove is provided in the casing upper surface, and/or a sheath stress-relief groove is provided in the sheath upper surface.

BRIEF SUMMARY OF THE DRAWINGS

Other features and advantages of the present disclosure will be clear from the description thereof which is given below as an example, but not limited to, with reference to the enclosed figures, among which:

FIG. 2 is mounted;

DETAILED DESCRIPTION

Figure 1:
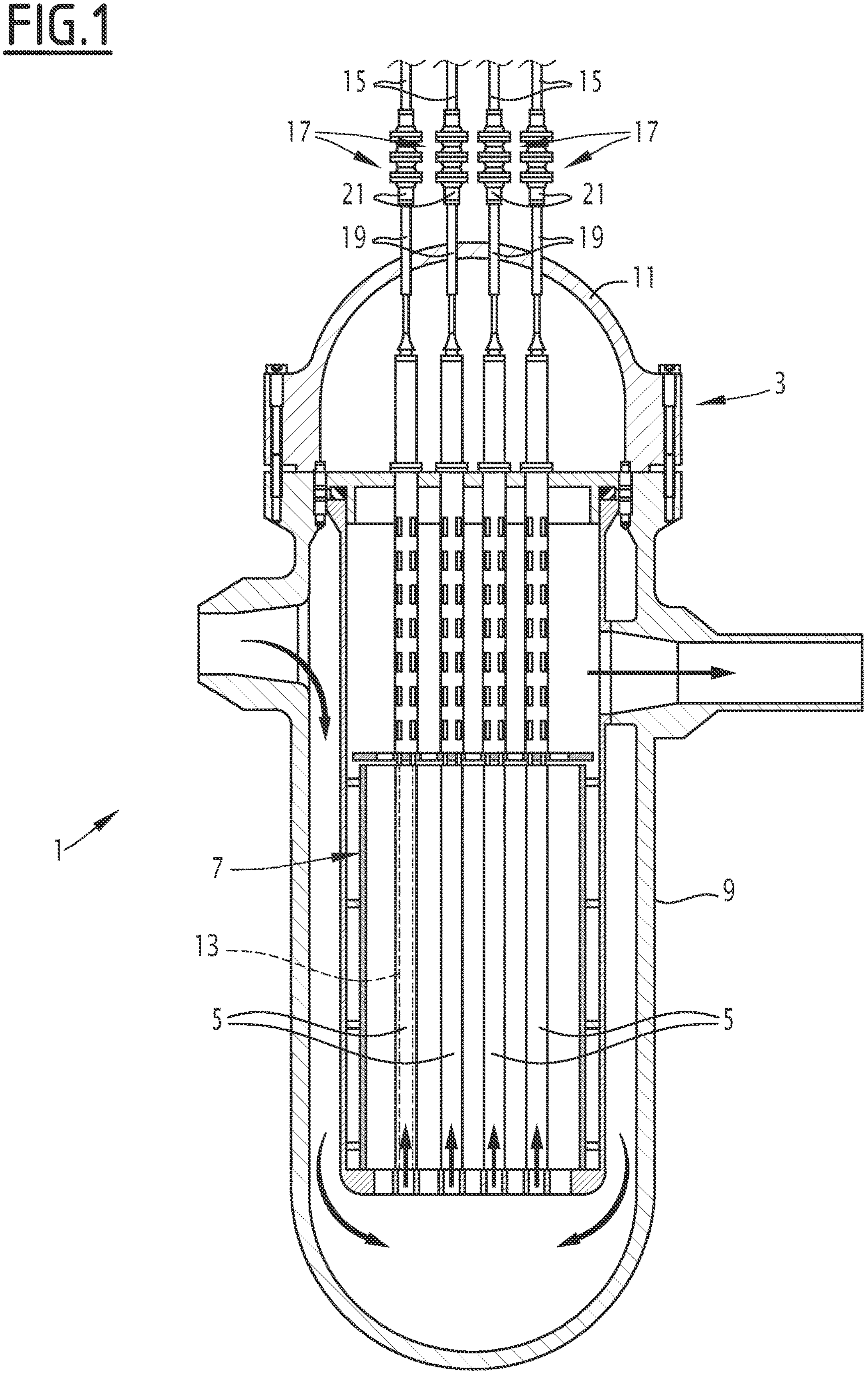
FIG. 1 is a simplified schematic representation of a nuclear reactor.

The nuclear reactor 1 shown in FIG. 1 includes a pressure vessel 3 wherein are arranged nuclear fuel assemblies 5 forming the core 7 of the nuclear reactor.

The pressure vessel 3 includes a lower part 9 and a cover 11 removably attached to the lower part 9.

The nuclear reactor 1 further includes control rod assemblies 13 which can be inserted into or extracted from the core 7 in order to control the reactivity of the core.

Each rod assembly 13 comprises a plurality of rods made of a neutron absorbing material.

Each control rod assembly 13 is attached to the end of a drive rod 15 which is moved by a rod assembly control mechanism (MCG).

The rod assembly control mechanisms (MCGs) each ensure the extraction, the maintaining or the insertion of a control rod assembly into the reactor core. MCGs should also authorize the free fall of the drive rods of the rod assemblies during the opening of automatic shutdown circuit breakers of the reactor.

Thereby, the nuclear reactor 1 comprises a plurality of drive assemblies 17, each dedicated to a control rod assembly 13.

Figure 2:
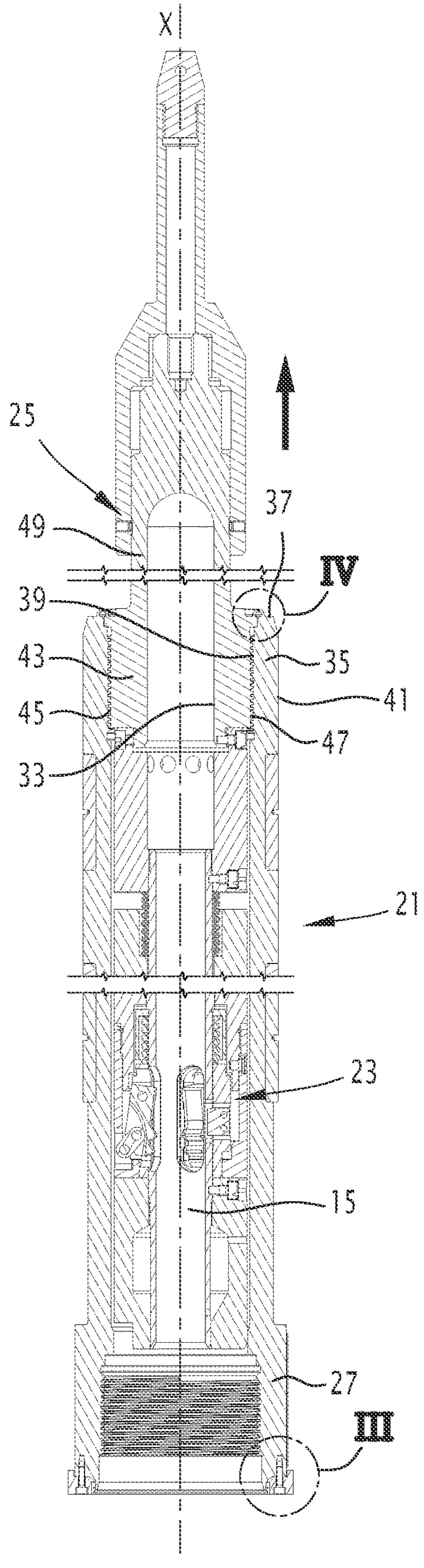
FIG. 2 is a section view of a rod assembly control mechanism of the nuclear reactor shown in FIG. 1.

Each drive assembly 17 comprises an adapter 19 rigidly attached to the closure head 11 of the pressure vessel, a casing 21 for receiving a mechanism 23 for lifting the drive rod 15 of the control rod assembly 13 and a sheath 25 for receiving the drive rod 15 (FIGS. 1 and 2). In FIG. 1, the sheaths are not shown so as to reveal the upper ends of the control rods 15.

The adapter 19 is engaged in a through orifice of the vessel head 11 and is rigidly fixed thereto. It passes through the vessel head 11 and defines a passage through which the drive rod 15 moves.

The lifting mechanism 23 is generally called a lifting mechanism assembly (EML). Such a mechanism is an actuator the function of which is to control, to insert or to extract the drive rod 15.

The casing 21 and sheath 25 together form a pressure enclosure, in fluidic communication, through the adapter 19, with the inside of the pressure vessel.

The lifting mechanism 23, the casing 21 and the sheath 25 form the sub-assembly generally referred to by the term rod assembly control mechanism (MCG).

The casing 21 is a tubular part having a central axis substantially corresponding to the axis of movement X of the drive rod 15. Same internally delimits an internal volume wherein the drive rod 15 is engaged. The lifting mechanism 23 is housed between the rod and the wall of the casing.

In the present description, the terms lower and upper, the bottom and the top, are understood along the axis of movement X of the drive rod 15.

Said rod is normally vertical.

The casing 21 has a casing lower end 27 connected in a leak-tight way to the adapter 19.

More precisely, the casing lower end 27 is typically screwed onto an upper end 29 of the adapter 19.

Figure 3:
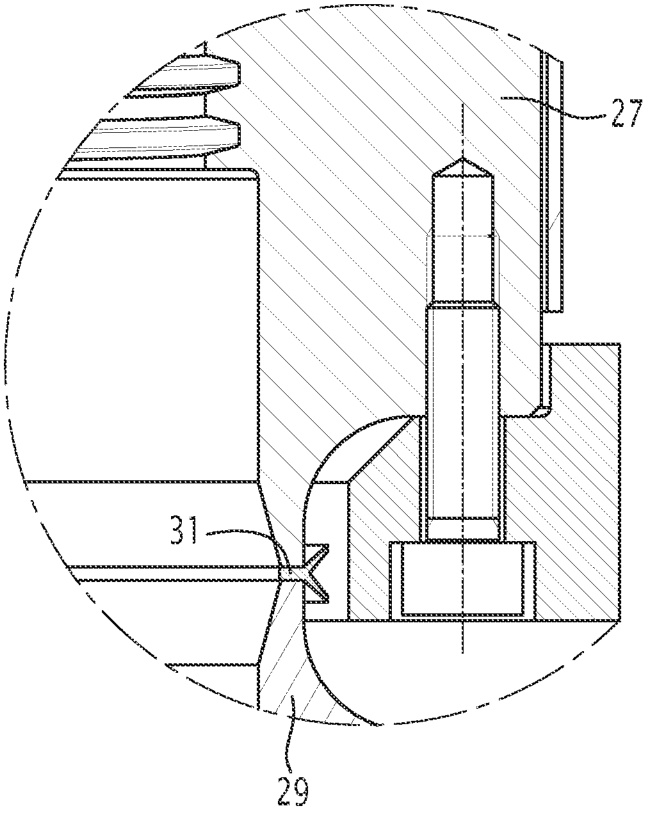
FIG. 3 is an enlarged view of the "Canopy" seal of the welded connection between the casing and the adapter on which the rod assembly control mechanism shown

The sealing between the casing lower end 27 and the upper end 29 of the adapter is provided by a welded seal 31, frequently called a "Canopy" seal (FIG. 3).

The sheath 25 forms the upper part of the pressure vessel.

Same delimits an internal volume 33 wherein the drive rod 15 is housed in the upper position of the control rod assembly 13. The internal volume 33 is closed at the top and communicates downwards with the internal volume of the casing 21.

The casing 21 has a casing upper end 35 with tubular shape around the axis of movement X.

The shape of the casing upper end 35 and the shape of the sheath lower end 43 before the application of the method of the present disclosure will now be described.

Figure 4:
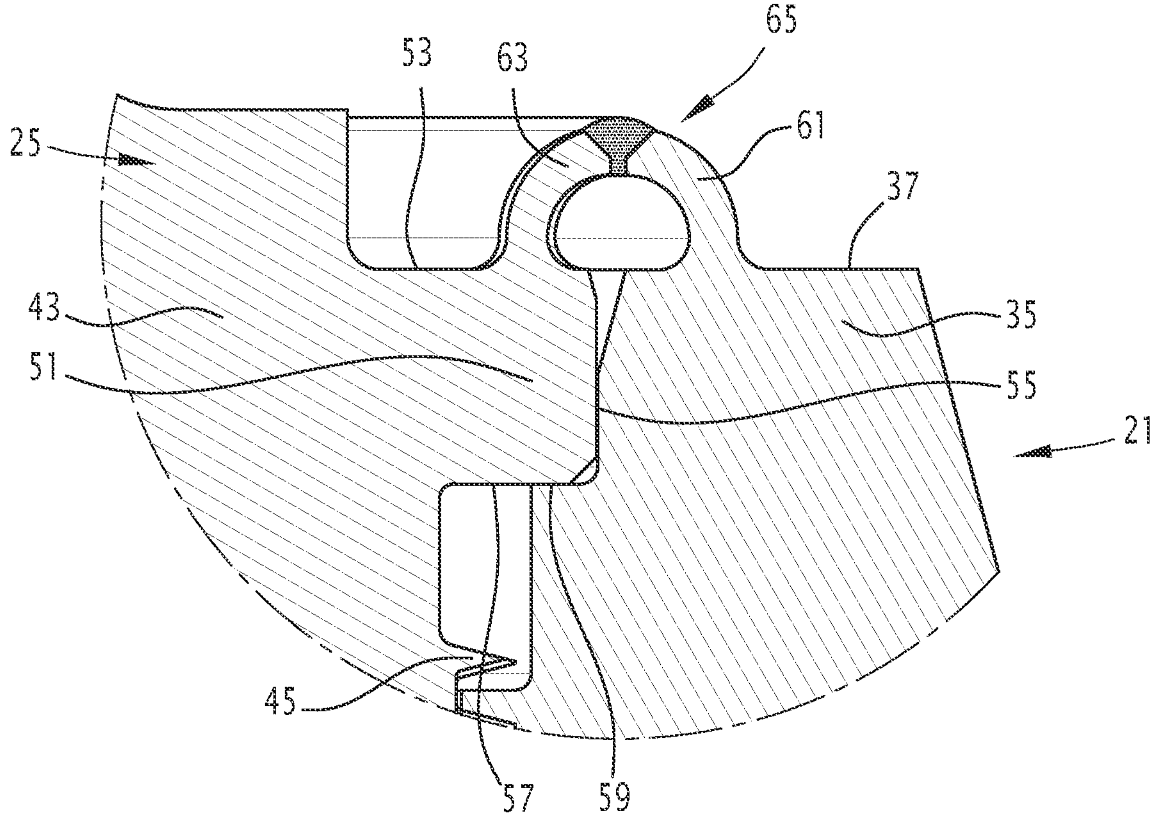
FIG. 4 is an enlarged view of the "Omega" seal of the welded connection between the casing and the sheath of the rod assembly control mechanism shown in FIG. 2, before implementation of the maintenance method of the present disclosure.

As can be seen in FIGS. 2 and 4, the casing upper end 35 has a substantially annular casing upper surface 37 perpendicular to said axis of movement X and oriented opposite the adapter 19.

The casing upper end 35 further has a casing radially inner surface 39 and a casing radially outer surface 41;

The sheath 25 has a sheath lower end 43 engaged in the casing upper end 35 and attached thereto.

For this purpose, the sheath lower end 43 has an external thread 45 cooperating with an internal tapping 47 supported by the casing radially inner surface 39.

The sheath 25 further has a main part 49 situated outside the casing 21.

An annular rib 51 is provided on the sheath lower end 43, at the junction with the main part 49. The rib is situated above the external thread 45.

The sheath lower end 43 has a substantially annular sheath upper surface 53 perpendicular to the axis of movement X and oriented opposite the adapter 19.

The sheath upper surface 53 is defined by the annular rib 51.

The sheath upper surface 53 extends substantially in the same plane as the casing upper surface 37.

The sheath lower end 43 further has a radially outer surface 55.

The radially outer surface 55 is defined by the annular rib 51.

It abuts against the casing radially inner surface 39.

Furthermore, the annular rib 51 defines a sheath lower surface 57, substantially annular and perpendicular to the axis of movement X. The sheath lower surface 57 abuts on a shoulder 59 formed in the radially inner surface 47 of the casing upper end 35.

As illustrated in FIG. 4, before implementing the method of the present disclosure, the casing 21 comprises a first lip 61 at the casing upper end 35.

The sheath 25 has a second lip 63 at the sheath lower end 43.

The first lip 61 and the second lip 63 are welded to each other and together form an omega seal 65.

The casing upper surface 37 supports the first lip 61.

The sheath upper surface 53 supports the second lip 63.

The first and second lips 61, 63 each extend all around the axis X and have closed contours. The lips are curved towards each other, and each have a section in the shape of a quarter of a circle. Together, the lips form a half torus, coaxial with the axis X.

The first and second lips 61, 63 delimit with the casing upper surface 37 and with the sheath upper surface 53, a cavity extending all around the axis X.

The seal 65 is called omega-shaped because of the shape thereof.

The maintenance method aims to intervene on the drive assembly 17, for carrying out a maintenance operation of same.

The detection method comprises the following steps:

removing the first and second lips 61, 63;

carrying out at least one maintenance operation on the drive assembly 17;

creating a welding surface 67 at the casing upper end by machining said casing upper end 35;

creating a leak-tight welded connection 69 between the casing 21 and the sheath 25 or a replacement sheath 71, by welding the welding surface 67 and a matching welding surface 73 provided at the sheath lower end 43 of the sheath 25 or at a sheath lower end of the replacement sheath 71.

During the removal step, the first and second lips 61, 63 are completely removed. Such operation is carried out on site, after dismantling the vessel closure head 11 and storing same on the stand thereof.

The removal is typically carried out by remote operation, by any suitable means (grinding wheel, saw, machining machine, etc.)

The at least one maintenance operation typically comprises one or a plurality of the following operations:

replacement of the sheath 25, replacement or repair of the EML 23, machining of the casing upper end 35 and associated checks, etc.

The welding surface 67 is created by machining, i.e. by removing material from the casing upper end 35, leading to a permanent modification of the shape of the casing upper end 35.

The welding surface 67 is created by machining at least the casing upper surface 37, and, if appropriate, also by machining the casing radially inner surface 39 and/or the casing radially outer surface 41.

After machining, the casing upper end 35 still has a casing upper surface, a casing radially inner surface and a casing radially outer surface, but one or a plurality of said surfaces have shapes different from the original shapes thereof. In the following description, such surfaces are still referred to by the references 37, 39 and 41, after machining.

Figure 5:
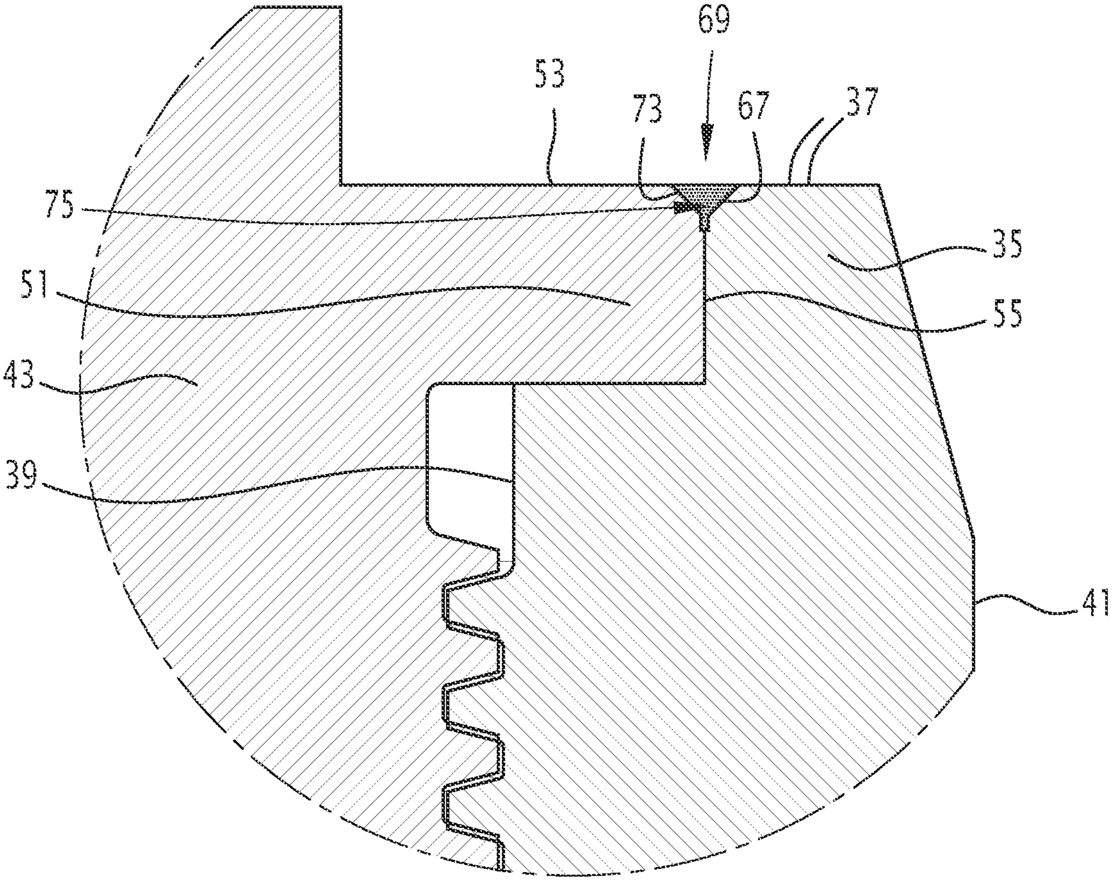
FIGS. 5 to 13 are views similar to the view shown in FIG. 4, after implementing different variants of the method of the present disclosure.
Figure 8:
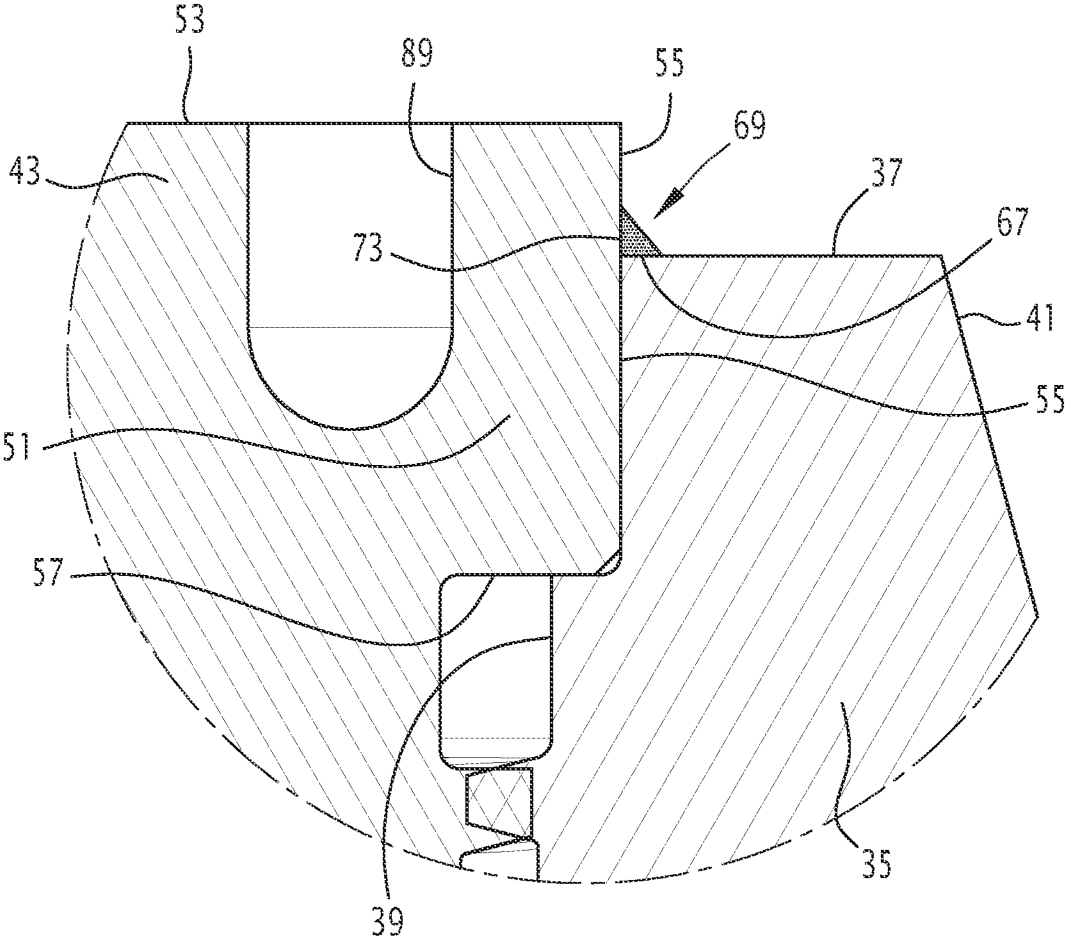
Figure 9:
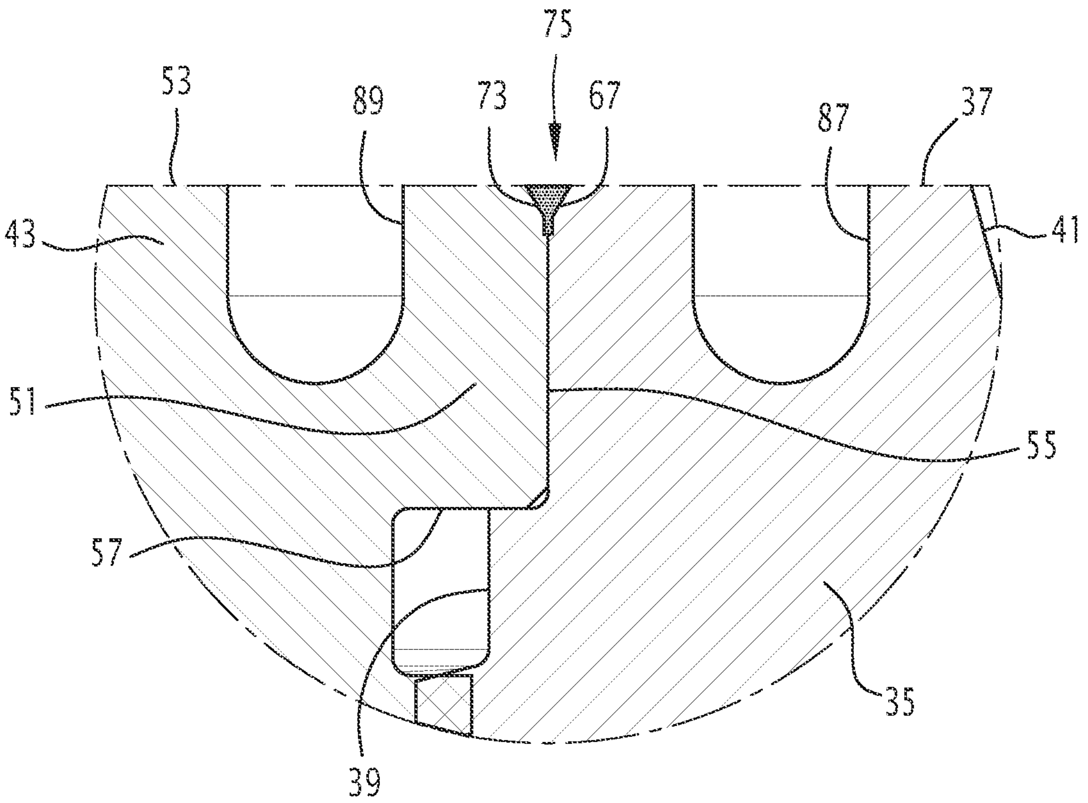

According to a first embodiment, the method comprises a step of creating the matching welding surface 73 at the sheath lower end 43 by machining the lower end of the original sheath 25 (see FIGS. 5, 8 and 9).

In such case, the matching welding surface 73 is created by machining at least the sheath upper surface 53, and, if appropriate, additionally by machining the sheath radially outer surface 55.

After machining, the sheath lower end 43 still has a sheath upper surface and a sheath radially outer surface, but one or a plurality of the surfaces have shapes different from the original shapes thereof. In the following description, such surfaces are still referred to by the references 53 and 55.

According to a second embodiment, the original sheath 25 is replaced by the replacement sheath 71 (see FIGS. 6, 7 and 10 to 13).

The method then comprises a step of manufacturing the replacement sheath 71 and a step of mounting the replacement sheath 71 on the casing 21.

The replacement sheath 71 is manufactured in a remote factory, the matching welding surface 73 being formed during the manufacture of the replacement sheath.

The replacement sheath 71 has the same shape as the original sheath 25, with the exception of the annular rib 51.

In other words, the replacement sheath 71 includes an annular rib 51 with a shape different from the shape of the annular rib 51 of the original sheath 25. The other elements thereof are all identical to the elements of the original sheath 25.

According to a first variant of embodiment, the leak-tight welded connection 69 is produced by a fillet welding of the welding surface 67 and of the matching welding surface 73 (FIGS. 5, 8 and 9).

According to a first sub-variant, the welding surface 67 and the matching welding surface 73 form a V-shaped groove 75 (FIGS. 5 and 9).

The V-shaped groove 75 has a cross-section which progressively narrowing axially (FIGS. 5 and 9), or radially.

In a first case (FIGS. 5 and 9), the V-shaped groove 75 is hollowed out in the sheath upper surface 53 and in the casing upper surface 37.

In particular, the welding surface 67 is created by machining the edge linking the casing radially inner surface 39 and the casing upper surface 37.

The matching welding surface 73 is created e.g. by machining the edge linking the sheath radially outer surface 55 and the sheath upper surface 53.

In a second case (not shown), the V-shaped groove 75 is hollowed out in the sheath radially outer surface 55 and in the casing radially outer surface 41.

The leak-tight welded connection 69 is made by filling the V-shaped groove 75 with a filler metal.

According to a second sub-variant, the welding surface 67 is an annular zone of the casing upper surface 37 and the matching welding surface 73 is a zone of the sheath radially outer surface 55 (FIG. 8).

The welding surface 67 extends against and along the matching welding surface 73.

For example, the welding surface 67 is created by machining the casing upper end 35 so as to shorten same axially. In other words, the end section is completely removed, so as to bring the casing upper surface 37 under the sheath upper surface 53 and to form a step between the surfaces 37 and 53.

The leak-tight welded connection 69 is produced by filling with a filler metal, the corner between the welding surface 67 and the matching welding surface 73.

The first variant of embodiment, according to the different sub-variants thereof, is applicable within the framework of the first embodiment or of the second embodiment.

According to a second variant of embodiment, the leak-tight welded connection 69 is produced by butt welding of the welding surface 67 and of the matching welding surface 73 (FIGS. 6, 7, 10, 11, 12 and 13).

According to a first sub-variant (FIGS. 10, 11, 13), the welding surface 67 is provided on a third lip 77 machined in the casing upper end 35.

The matching welding surface 73 is provided on a fourth lip 79 supported by the sheath upper end 43.

The third lip 77 and the fourth lip 79 together define an omega-shaped seal 81.

The third lip 77 is supported by the casing upper surface 37.

The fourth lip 79 is supported by the sheath upper surface 53.

Figure 10:
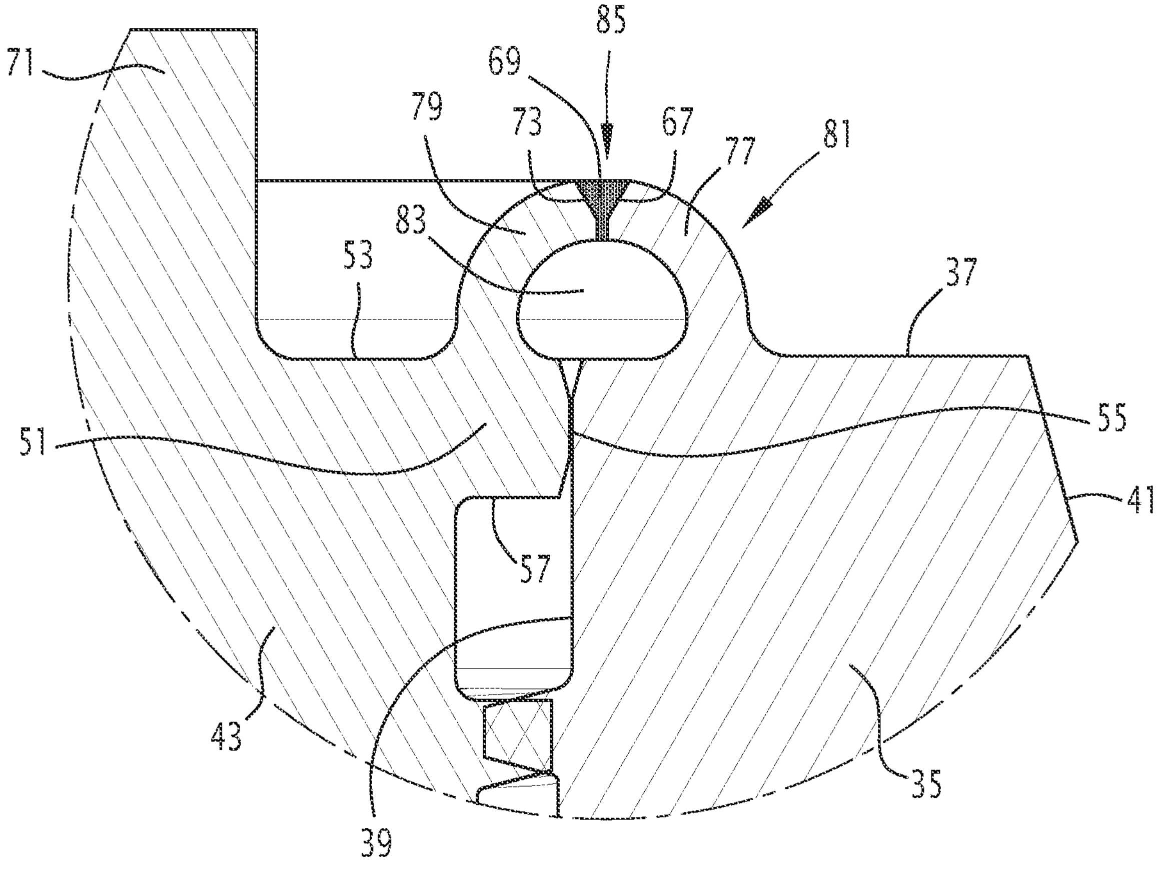

According to a first possibility, the third and fourth lips 77, 79 have the same shape as the first and second lips 61, 63, respectively, and the omega seal 81 has the same shape as the omega seal 65 (FIG. 10).

In other words, the third and fourth lips 77, 79 each extend all around the axis of movement X and have closed contours. The lips are curved towards each other, and each have a section in the shape of a quarter of a circle. Together, the lips form a half torus, coaxial with the axis of movement X.

The third and fourth lips 77, 79 delimit with the casing upper surface 37 and with the sheath upper surface 53, a cavity 83 extending all around the axis of movement X.

The welding surface 67 is formed on the end of the third lip 77. The matching welding surface 73 is formed on the end of the fourth lip 79.

The welding surface 67 and the matching welding surface 73 are inclined with respect to each other and delimit a groove 85 therebetween.

The width of the groove 85, taken in a radial plane containing the axis of movement X, decreases from the outside of the omega-shaped seal 81 inwards, i.e. towards the cavity 83.

The groove 85 is located at the top of the omega-shaped seal 81.

Before filling, the groove 85 emerges along the axis X, on the two opposite sides. The groove emerges downwards into the cavity 83. The groove emerges upwards opposite the cavity 83.

The leak-tight welded connection 69 is produced by butt welding of the third and fourth lips 77, 79, by filling the groove 85 with a filler metal.

According to a second possibility (FIG. 11), the casing upper surface 37 and/or the sheath upper surface 53 are slightly hollowed out, so that the cavity 83 has a circular cross-section in a radial plane containing the axis X.

According to a third possibility (FIG. 13), the groove 85 is situated on the radially outer side of the omega-shaped seal 81.

Before filling, the groove 85 emerges along a radial direction perpendicular to the axis of movement X, on the two opposite sides. The groove emerges radially inwards into the cavity 83. It emerges radially outwards opposite the cavity 83.

The third lip 77, considered in section in a radial plane containing the axis of movement X, extends substantially rectilinearly from the casing upper surface 37, parallel to the axis of movement X. The fourth lip 79, considered in section in a radial plane containing the axis of movement X, comprises a rectilinear part 87 extending substantially rectilinearly from the casing upper surface 37, parallel to the axis of movement X, and an arched part 89 continuing the rectilinear part 87.

The arched part 89 in the example shown is a half-circle, but could cover less than 180° or more than 180°, depending on the height of the third lip 77.

The width of the groove 85, taken in a radial plane containing the axis of movement X, decreases from the outside of the omega-shaped seal 81 inwards, i.e. towards the cavity 83.

According to a second sub-variant (FIGS. 6, 7 and 12), a casing half-cavity 91 is hollowed out on the surface of the casing 21, a sheath half-cavity 93 being hollowed out on the surface of the sheath 25, the casing half-cavity 91 and the sheath half-cavity 93 together defining a cavity 95 arranged along the welded connection 69.

In this way it is possible to carry out a butt welding of the welding surface 67 and of the matching welding surface 73.

Like in the first sub-variant, the welding surface 67 and the matching welding surface 73 are inclined with respect to each other and delimit a groove 85 therebetween.

The width of the groove 85, taken in a radial plane containing the axis of movement X, decreases from the outside of the welded connection 69 inwards, i.e. towards the cavity 95.

Before filling, the groove 85 emerges into the cavity 95 via the narrowest end thereof.

Indeed, when the bottom of the groove 85 is not emerging, the bottom forms a zone where the risk of cracking is particularly high. Making the bottom of the groove 85 emerging into the cavity considerably reduces such risk.

At the time of welding the surfaces 67 and 73 to each other, the cavity 95 is advantageously filled with an inert gas.

According to a first possibility of embodiment (FIGS. 6 and 7), the casing half-cavity 91 is hollowed out in the casing radially inner surface 39, the sheath half-cavity 93 being hollowed out in the sheath radially outer surface 55, the cavity 95 being arranged axially under the welded connection 69.

According to a second possibility of embodiment (FIG. 12), the casing half-cavity 91 is hollowed out in the casing upper surface 37, the sheath half-cavity 93 being hollowed out in the sheath lower surface 57, the cavity 95 being arranged radially under the welded connection 69.

In all cases, the method comprises a step of machining the casing half-cavity 91 in the casing upper end 35.

According to the first embodiment, the method comprises a step of machining the sheath half-cavity 93 in the sheath lower end 43.

According to the second embodiment, the sheath half-cavity 93 is provided during manufacture of the replacement sheath 71.

The second variant of embodiment, according to the different sub-variants thereof, is particularly suitable for the second embodiment. It can also be used with the first embodiment, depending on the initial shape of the sheath.

According to an advantageous aspect applicable to the different variants and sub-variants, a casing stress-relief groove 87 is provided in the casing upper surface 37 (FIG. 9), and/or a sheath stress-relief groove 89 is provided in the sheath upper surface (FIGS. 6 to 9 and 12).

The grooves 87, 89 are correspondingly provided for reducing the stresses generated in the metal forming the casing upper end 35 and/or the sheath lower end 43 at the time of welding.

When the groove 87 is present, it extends all around the axis X.

The method then comprises a step of machining the stress-relief groove 87 in the casing upper surface 37.

When the groove 89 is present, it extends all around the axis X.

According to a variant applicable to the first embodiment, the method then comprises a step of machining the stress-relief groove 89 in the sheath upper surface 53.

According to another variant applicable to the second embodiment, the groove 89 is provided during the manufacture of the replacement sheath 71.

The presence of at least one stress-relief groove is particularly suitable for the first variant (fillet welding).

A plurality of examples of embodiments of the present disclosure will now be briefly described, with reference to FIGS. 5 to 13. Elements which are identical or which perform the same functions will have the same references in all the embodiments.

According to the embodiment shown in FIG. 5, the welding surface 67 and the matching welding surface 73 form a V-shaped groove 75 hollowed out in the sheath upper surface 37 and in the casing upper surface 53 (first variant, first sub-variant).

The V-shaped groove 75 runs at the contact surface between the casing radially inner surface 39 and the sheath radially outer surface 55.

The V-shaped groove 75 has a cross-section which progressively narrows axially.

The bottom of the groove 75 is closed.

There is no stress-relief groove provided on the sheath upper surface nor on the casing upper surface.

The casing 21 does not have a casing half-cavity 91 and the sheath 25 does not have a sheath half-cavity 93.

During the creation step, the welding surface 67 is created by machining the edge connecting the casing radially inner surface 39 and the casing upper surface 37.

The method includes a step of creating the matching welding surface 73 by machining the edge connecting the sheath radially outer surface 55 and the sheath upper surface 53 of the original sheath 25.

In a variant, the original sheath 25 is replaced by a replacement sheath 71, the matching welding surface 73 being formed during manufacture of the replacement sheath.

Figure 6:
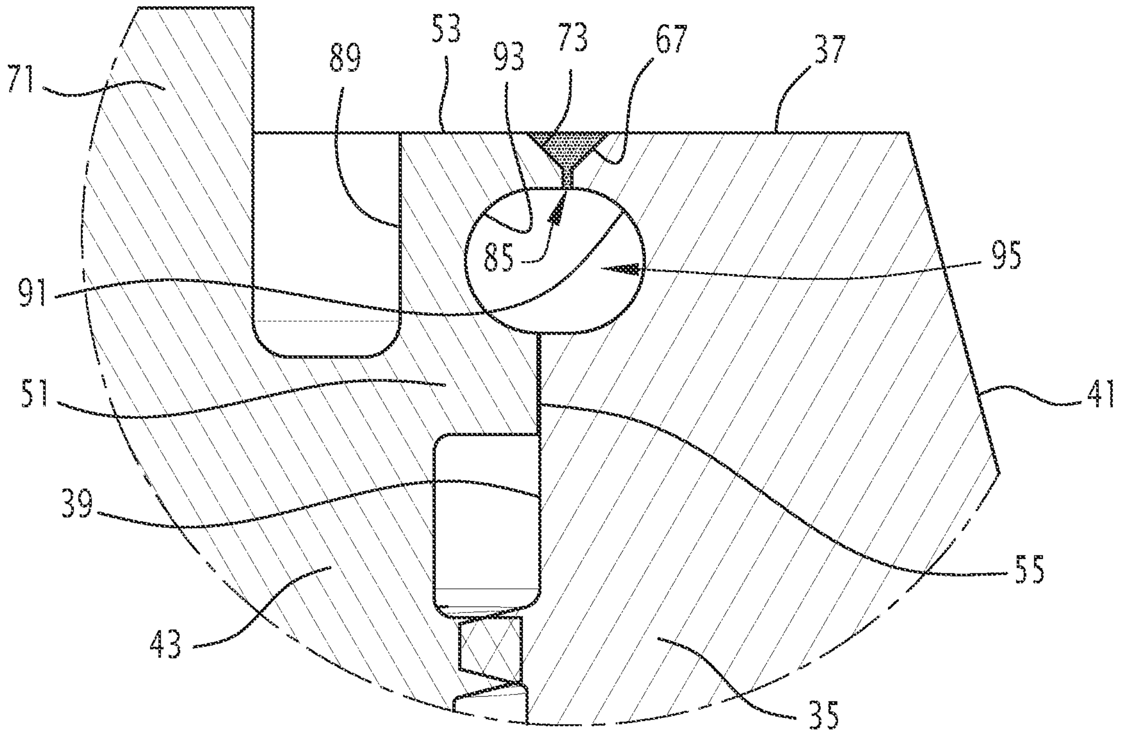

In the embodiment shown in FIG. 6, the welding surface 67 and the matching welding surface 73 form a groove 85 hollowed out in the sheath upper surface 37 and in the casing upper surface 53 (second variant, second sub-variant).

The groove 85 runs at the contact surface between the casing radially inner surface 39 and the sheath radially outer surface 55.

The groove 85 has a cross-section which progressively narrows axially.

The casing 21 has a casing half-cavity 91 hollowed out in the casing radially inner surface 39. The sheath 25 has a sheath half-cavity 93 hollowed out in the sheath radially outer surface 55. The cavity 95 extends axially under the groove 85.

The bottom of the groove 85 emerges into the cavity 95.

In a radial plane containing the axis X, the cavity 95 has an oval cross-section.

A stress-relief groove 89 is formed on the sheath upper surface 53. On the other hand, the casing upper surface does not have a stress-relief groove.

During the creation step, the welding surface 67 is created by machining the edge connecting the casing radially inner surface 39 and the casing upper surface 37.

The method comprises a step of machining the casing half-cavity 91 in the casing upper end 35.

The original sheath 25 is replaced by a replacement sheath 71, the matching welding surface 73 and the sheath half-cavity 93 being formed during the manufacture of the replacement sheath.

Figure 7:
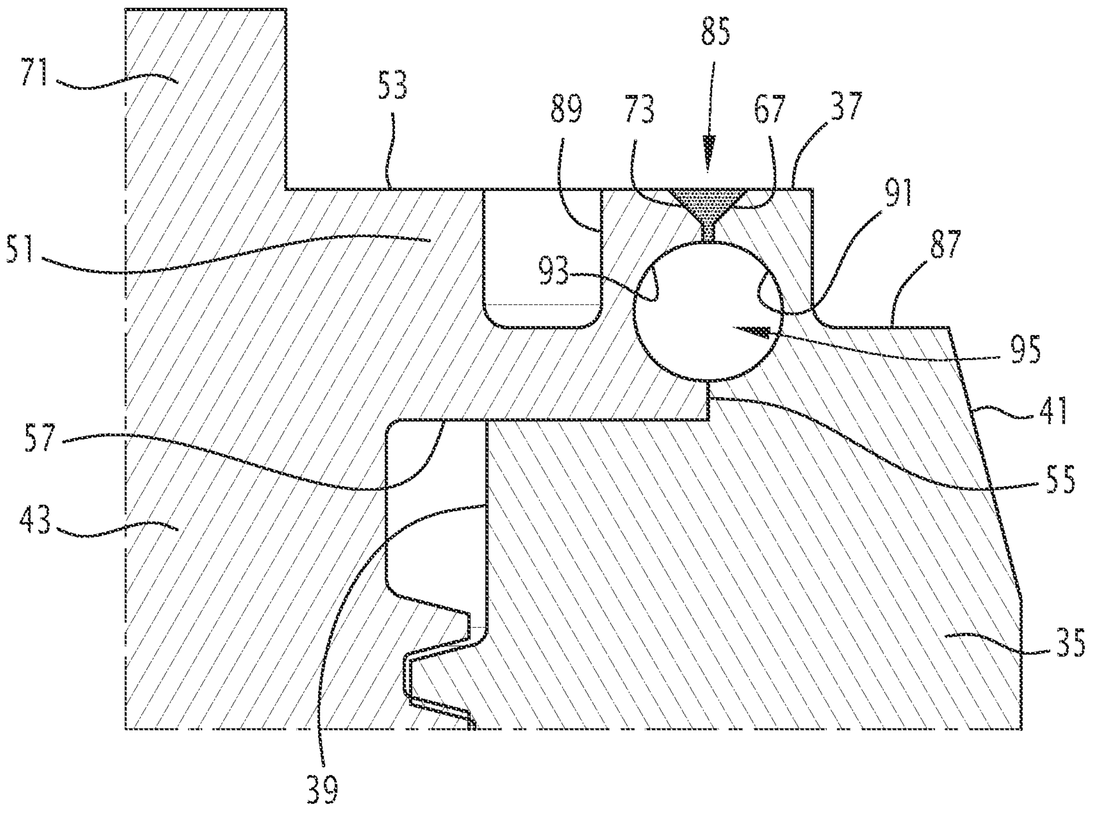

The embodiment shown in FIG. 7 is similar to the embodiment shown in FIG. 6. Only the points by which said example differs from the example shown in FIG. 6 will be discussed in detailed hereinbelow.

In the example shown in FIG. 7, the cavity 95 has a circular cross-section in a radial plane containing the axis X.

The casing upper surface 37 has a casing stress-relief groove 87. The groove is hollowed out in the outer edge of the casing upper surface 37. The groove is closed on a radially inner side and open on a radially outer side.

The method thus comprises a step of creating the casing stress-relief groove 87 by machining the casing upper surface 37.

According to the example shown in FIG. 8, the welding surface 67 is an annular zone of the casing upper surface 37 and the matching welding surface 73 is a zone of the sheath radially outer surface 55 (first variant of embodiment, second sub-variant).

The welding surface 67 extends against the matching welding surface 73 and along said surface.

During the creation step, the welding surface 67 is created by machining the casing upper end 35 so as to shorten same axially. In other words, the end section is completely removed, so as to bring the casing upper surface 37 under the sheath upper surface 53 and to form a step between the surfaces 37 and 53.

The original sheath 25 is preserved. The sheath radially outer surface 55 is not modified.

During the step of creating the leak-tight welded connection 69, the filler metal is deposited at the corner between the welding surface 67 and the matching welding surface 73.

A stress-relief groove 89 is formed on the sheath upper surface 53. On the other hand, the casing upper surface does not have a stress-relief groove.

The method then includes a step of machining the stress-relief groove 89 in the sheath upper surface 53.

In a variant, the original sheath 25 is replaced by a replacement sheath 71, manufactured with the stress-relief groove 89.

The embodiment shown in FIG. 9 is similar to the embodiment shown in FIG. 5. Only the points by which said example differs from the example shown in FIG. 5 will be discussed in detailed hereinbelow.

A stress-relief groove 89 is formed on the sheath upper surface 53.

The casing upper surface 37 has a casing stress-relief groove 87.

The groove is hollowed out substantially at the center of the casing upper surface 37.

It is closed on a radially inner side and on a radially outer side.

The method thus comprises a step of creating a casing stress-relief groove 87 by machining the casing upper surface 37.

According to the example shown in FIG. 10, the welding surface 67 is provided on a third lip 77 machined in the casing upper end 35, and the matching welding surface 73 is provided on a fourth lip 79 supported by the sheath upper end 43 (second variant of embodiment, first sub-variant).

The third lip 77 and the fourth lip 79 together define an omega-shaped seal 81.

The third lip 77 is supported by the casing upper surface 37.

The fourth lip 79 is supported by the sheath upper surface 53.

Such example corresponds to the first possibility described hereinabove.

There is no stress-relief groove provided on the sheath upper surface nor on the casing upper surface.

The casing 21 does not have a casing half-cavity 91 and the sheath 25 does not have a sheath half-cavity 93.

During the creation step, the casing upper end 35 is machined so as to form the third lip 77.

The original sheath 25 is replaced by a replacement sheath 71, manufactured with the fourth lip 79.

Figure 11:
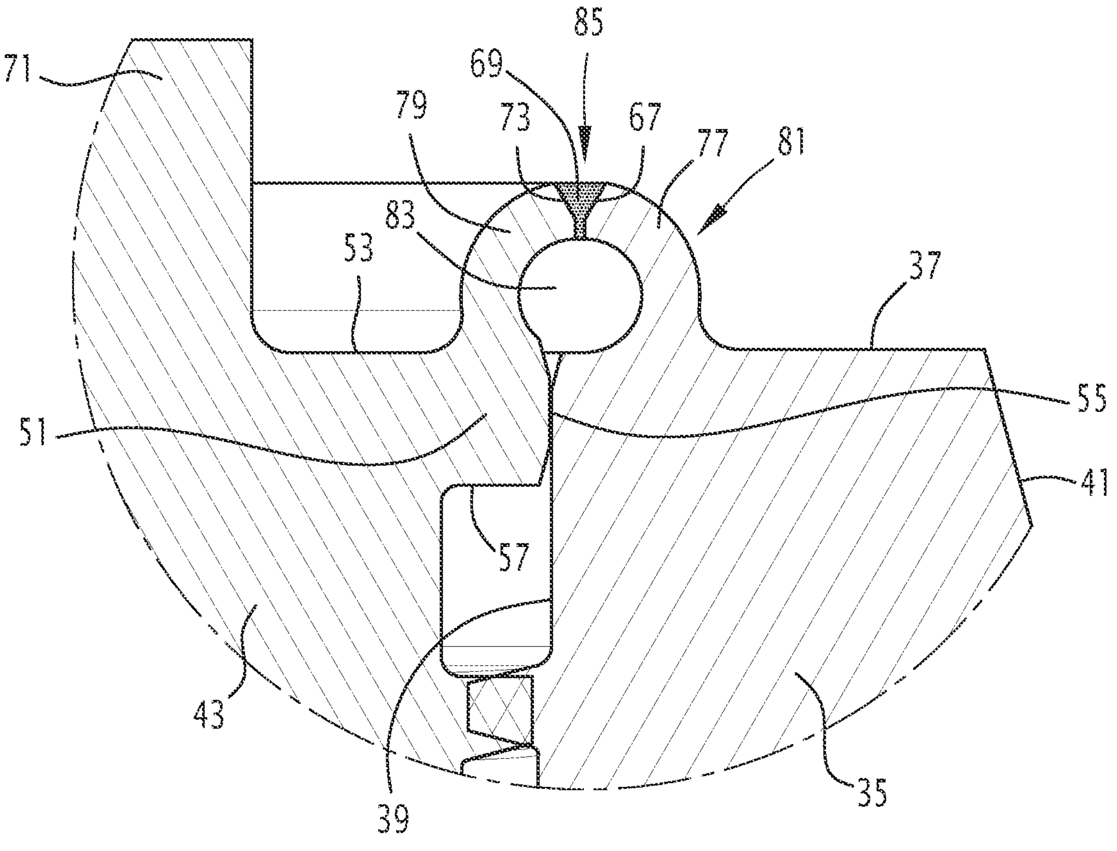

The embodiment shown in FIG. 11 is similar to the embodiment shown in FIG. 10. Only the points by which said example differs from the example shown in FIG. 10 will be discussed in detailed hereinbelow.

As indicated hereinabove, the casing upper surface 37 and the sheath upper surface 53 are slightly hollowed out, so that the cavity 83 has a circular cross-section in a radial plane containing the axis of movement X.

Such example also corresponds to the first possibility described hereinabove.

Figure 12:
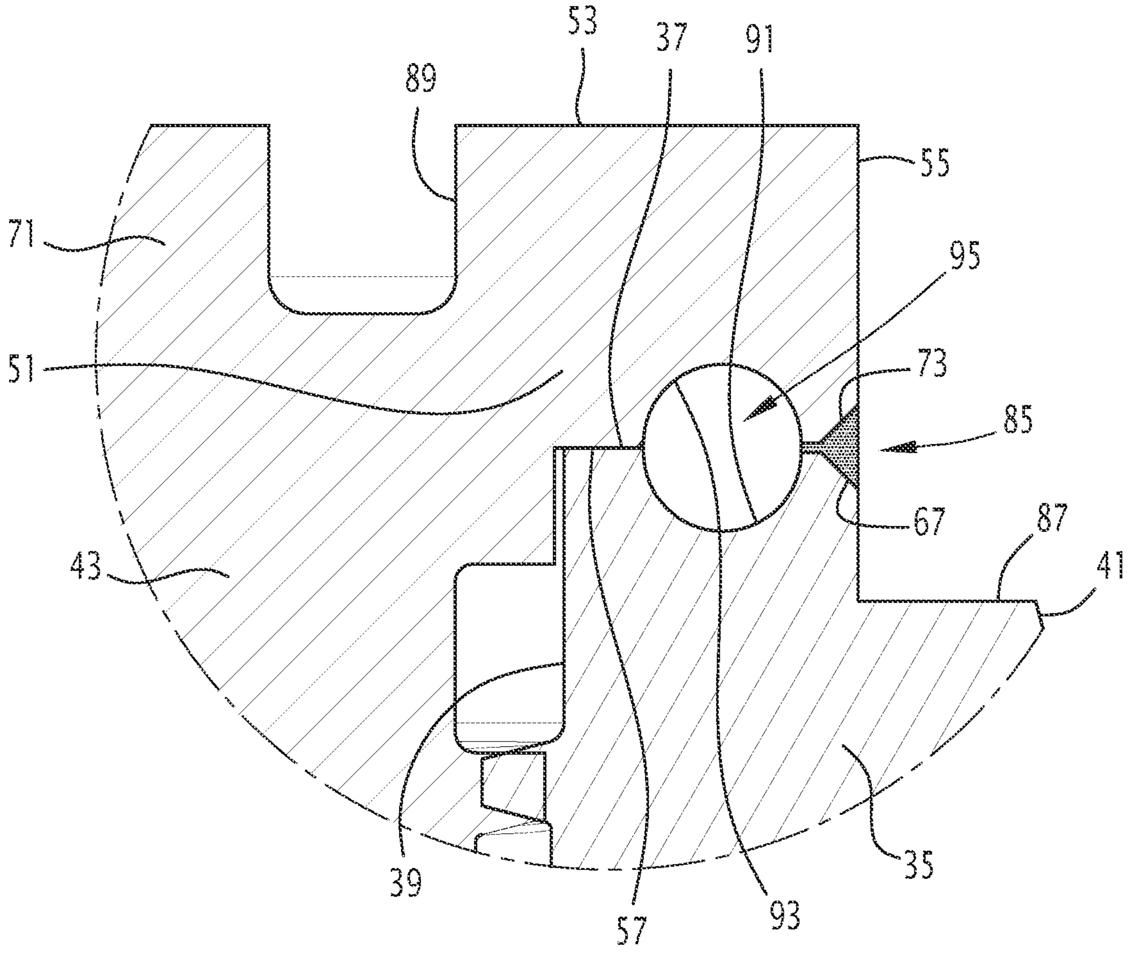

According to the example of embodiment shown in FIG. 12, the welding surface 67 and the matching welding surface 73 form a groove 85.

The groove 85 is hollowed out in the sheath radially outer surface 55 and in the casing radially outer surface 41.

The groove 85 runs at the level of the plane of contact between the casing upper surface 37 and the sheath lower surface 57.

The groove 85 has a cross-section which progressively narrows radially.

A casing half-cavity 91 is hollowed out in the casing upper surface 37, a sheath half-cavity 93 being hollowed out in the sheath lower surface 57. The cavity 95 is arranged radially under the welded connection 69, i.e. radially immediately inside the welded connection 69 (second variant, second sub-variant, second possibility).

The bottom of the groove 85 emerges into the cavity 95.

A sheath stress-relief groove 89 is provided in the sheath upper surface 53.

A stress-relief groove 87 is provided in the casing upper end 35. The groove 87 is open radially outwards, like in the example shown in FIG. 7.

During the creation step, the welding surface 67 is created by machining the casing upper end 35 so as to shorten same axially. In other words, the end section is completely eliminated.

In addition, the casing radially outer surface 41 is machined so as to create the stress-relief groove 87.

The edge connecting the inner side of the groove 87 to the casing upper surface 37 is machined obliquely so as to form the welding surface 67.

The casing upper surface 37 is hollowed out by machining so as to form the casing half-cavity 91.

The original sheath 25 is replaced by a replacement sheath 71, the matching welding surface 73 being formed during the manufacture of the replacement sheath.

The annular rib 51 of the replacement sheath 71 is radially wider than the rib of the original sheath 25. It defines a sheath lower surface 57 resting on the casing upper surface 37 and covering the latter entirely.

The matching welding surface 73 is an oblique surface connecting the sheath radially outer surface 55 to the sheath lower surface 57.

The stress-relief groove 87 and the sheath half-cavity 93 are formed during the manufacture of the replacement sheath 71.

Figure 13:
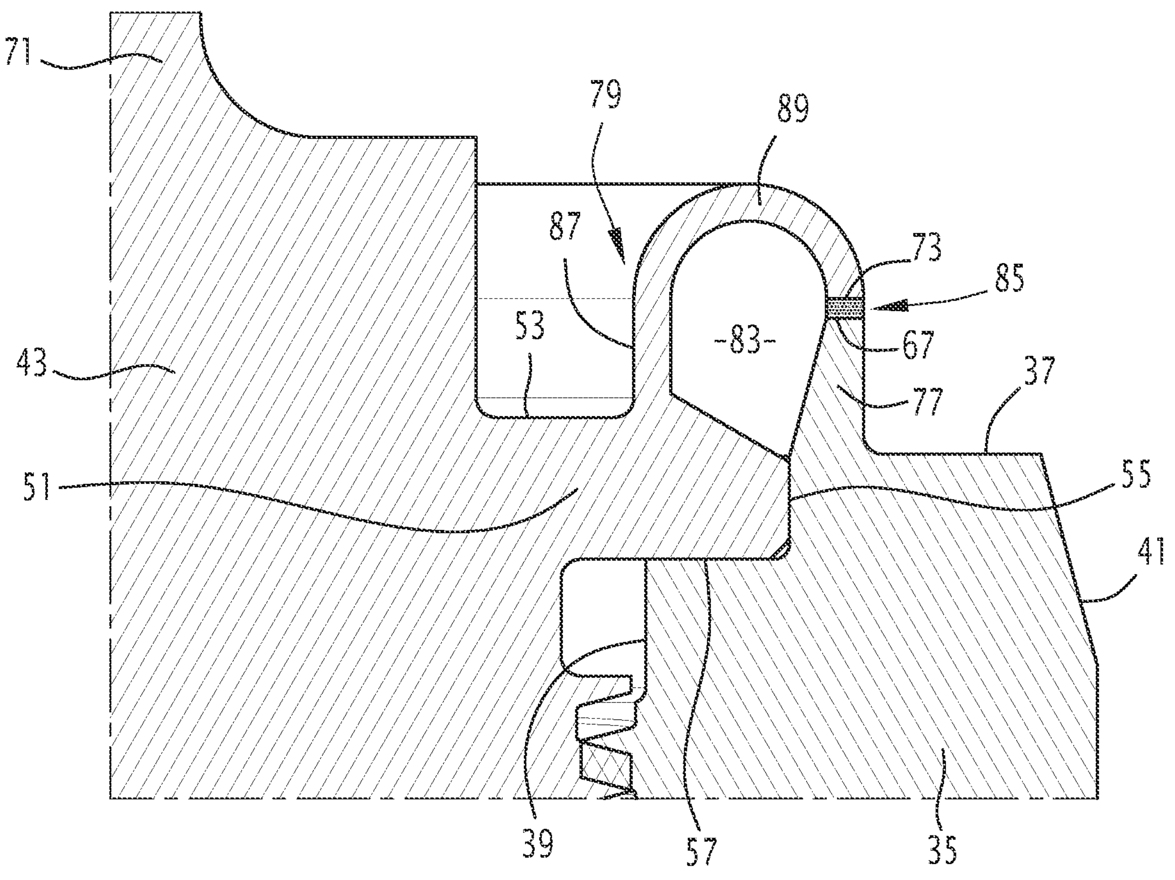

The example of embodiment shown in FIG. 13 differs from the example shown in FIG. 10 only in the shapes of the third lip 77 and of the fourth lip 79. Said shapes were described hereinabove.

What is claimed is:

1. A maintenance method for a nuclear reactor, the nuclear reactor comprising at least one drive assembly of a control rod assembly, each drive assembly comprising an adapter rigidly attached to a closure head of a pressure vessel of the nuclear reactor, a casing for receiving a mechanism for lifting a drive rod of the control rod assembly and a sheath for receiving the drive rod, the casing having a casing lower end connected in a leak-tight way to the adapter, the casing having a first lip at a casing upper end, the sheath having a second lip at a sheath lower end, the first lip and the second lip being welded together and forming an omega seal, the maintenance method comprising the following steps:

removing the first and second lips;

carrying out at least one maintenance operation on the control rod assembly;

creating a welding surface at the casing upper end by machining the casing upper end; and creating a leak-tight welded connection between the casing and the sheath or a replacement sheath, by welding the welding surface and a matching welding surface provided at the sheath lower end of the sheath or at a sheath lower end of the replacement sheath.

2. The maintenance method according to claim 1, wherein the matching welding surface is one piece with the sheath lower end, the welding surface being welded directly to the matching welding surface.

3. The maintenance method according to claim 1, wherein the casing upper end has a tubular shape about an axis of movement of the drive rod, the casing upper end having a substantially annular casing upper surface perpendicular to said axis of movement and oriented opposite the adapter, the casing upper end further having a casing radially inner surface and a casing radially outer surface, the sheath lower end having a substantially annular sheath upper surface perpendicular to said axis of movement and oriented opposite the adapter, the sheath lower end further having a sheath radially outer surface, the welding surface being produced by machining at least said casing upper surface.

4. The maintenance method according to claim 3, further comprising a step of creating the matching welding surface at the sheath lower end by machining at least the sheath upper surface.

5. The maintenance method according to claim 3, wherein the welding surface and the matching welding surface form a V-shaped groove provided in the sheath upper surface and in the casing upper surface.

6. The maintenance method according to claim 3, wherein the welding surface is an annular zone of the casing upper surface and the matching welding surface is a zone of the sheath radially outer surface, a fillet weld being made during the step of creating the leak-tight welded connection.

7. The maintenance method according to claim 3, wherein the welding surface is provided on a third lip machined into the casing upper end, the matching welding surface being provided on a fourth lip carried by a sheath upper end of the sheath, the third lip and the fourth lip together defining an omega-shaped seal.

8. The maintenance method according to claim 3, wherein a casing half-cavity is hollowed out in a surface of the casing, and a sheath half-cavity is hollowed out in a surface of the sheath, the casing half-cavity and the sheath half-cavity together defining a cavity arranged along the leak-tight welded connection, the welding surface and the matching welding surface forming a groove emerging into the cavity.

9. The maintenance method according to claim 8, wherein the cavity is arranged axially or radially below the leak-tight welded connection.

10. The maintenance method according to claim 3, wherein a casing stress-relief groove is provided in the casing upper surface, and/or a sheath stress-relief groove is provided in the sheath upper surface.

11. The maintenance method according to claim 1, wherein the casing upper end has a tubular shape about an axis of movement of the drive rod, the casing upper end having a substantially annular casing upper surface perpendicular to said axis of movement and oriented opposite the adapter, the casing upper end further having a casing radially inner surface and a casing radially outer surface, the sheath lower end having a substantially annular sheath upper surface perpendicular to said axis of movement and oriented opposite the adapter, the sheath lower end further having a radially outer surface, the welding surface being produced by machining at least said casing upper surface, and additionally by machining the casing radially inner surface and/or the casing radially outer surface.

12. The maintenance method according to claim 3, further comprising a step of creating the matching welding surface at the sheath lower end by machining at least the sheath upper surface and additionally the sheath radially outer surface.

* * * * *